United States Patent [19]
Wardrop

[11] Patent Number: 5,903,717
[45] Date of Patent: May 11, 1999

[54] FAULT TOLERANT COMPUTER SYSTEM

[75] Inventor: Andrew J. Wardrop, Lakeville, Minn.

[73] Assignee: General Dynamics Information Systems, Inc., Bloomington, Minn.

[21] Appl. No.: 08/832,479

[22] Filed: Apr. 2, 1997

[51] Int. Cl.$^6$ ........................................ G06F 11/00
[52] U.S. Cl. ................................. 395/182.1; 395/185.03; 371/36
[58] Field of Search ........................... 395/182.09, 182.1, 395/182.08, 182.11, 182.13, 181, 182.02, 185.01, 185.03; 371/36

[56] References Cited

U.S. PATENT DOCUMENTS

| | | | |
|---|---|---|---|
| 4,817,091 | 3/1989 | Katzman et al. | 395/182.09 |
| 5,233,615 | 8/1993 | Goetz | 395/182.1 |
| 5,280,487 | 1/1994 | Bergkvist | 371/36 |
| 5,295,258 | 3/1994 | Jewett et al. | 395/182.09 |
| 5,339,404 | 8/1994 | Vandling III | 395/180 |
| 5,349,654 | 9/1994 | Bond et al. | 371/36 |
| 5,680,408 | 10/1997 | Tsirkel | 395/182.09 |
| 5,742,753 | 4/1998 | Nordsieck et al. | 395/182.09 |

FOREIGN PATENT DOCUMENTS 0496506  7/1992  European Pat. Off. ........ G06F 11/16

OTHER PUBLICATIONS

Davies et a l., "Synchronization and Matching in Redundant-systems", IEEE Trans. on Computers vol. c–27, No. 6, pp. 531–539, Jun. 1978.

*Primary Examiner*—Joseph E. Palys
*Attorney, Agent, or Firm*—Holland & Hart LLP; Anglin & Giaccherini; William J. Kubida

[57] ABSTRACT

A fault tolerant computer system is disclosed which uses redundant voting at the hardware clock level to detect and to correct single event upsets (SEU) and other random failures. In one preferred embodiment, the computer (30) includes four or more commercial processing units (CPUs) (32) operating in strict "lock-step" and whose outputs (33, 37) to system memory (46) and system bus (12) are voted by a gate array (50) which may be implemented in a custom integrated circuit (34). A custom memory controller (18) interfaces to the system memory (46) and system bus (12). The data and address (35, 37) at each write to and read from memory (46) within the computer (30) are voted at each CPU clock cycle. A vote status and control circuit (38) "reads" the status of the vote and controls the state of the CPUs using hardware and software. The majority voted signals (35) are used by the agreeing CPUs 32 to continue processing operations without interruption. The system logic selects the best chance of recovering from a detected fault by resynchronizing all CPUs (32), powering down a faulty CPU or switching to a spare computer (30), resetting and re-booting the substituted CPUs (32).

14 Claims, 8 Drawing Sheets

FAULT TOLERANT COMPUTER SYSTEM

CROSS-REFERENCE TO A RELATED PATENT APPLICATION

The present Application is related to a commonly-owned and commonly-assigned U.S. patent application entitled Ser. No. 08/852,487, Non-Intrusive Power Control for Computer Bus System, which was filed on April 1997.

FIELD OF THE INVENTION

The present invention relates to the field of high performance, fault tolerant computer processors. More particularly, this invention provides redundant voting methods and apparatus at the hardware clock level. The invention may be employed to detect and to correct errors in computers, especially remotely installed computers, such as those aboard spacecraft in orbit.

FEDERALLY SPONSORED RESEARCH OR DEVELOPMENT

Not Applicable.

BACKGROUND OF THE INVENTION

The natural radiation environment on Earth and in space can often cause short term and long term degradation of semiconductor devices used in computers. This hazard is a problem for computers where fault-free operation is required. In addition to these radiation effects, computer chips are subject to random failures due to undetected defects and weaknesses that evolve over the course of time. Trace radioactive materials in semiconductor packages may also cause faults. When computers must operate for long periods in a remote environment, or where these devices must operate without fault for long periods of time, the need for systems which are protected from faults or failure becomes critical. Remote or vulnerable environments include remote oil platforms, submarines, aircraft and isolated sites such as Antarctica. Systems that operate in Earth orbit and beyond are especially vulnerable to this radiation hazard.

The presence of cosmic rays and particularly high energy particles in space near the Van Allen radiation belt can produce a disturbance called a single event effect (SEE) or a single event upset (SEU). The magnetic field of the Earth deflects particles and changes their energy levels and attributes. The Earth's magnetic field also traps charged particles that travel from the Sun and other stars toward the Earth. Some particles that are not trapped by the Earth's magnetic field are steered by that field into our atmosphere near the poles. These particles can penetrate the electronic devices aboard satellites.

When high energy particles and gamma rays penetrate a semiconductor device, they deposit charge within the computer circuit and create transients and/or noise. This phenomenon can "upset" the memory circuits. One type of upset occurs when a single bit of data stored in the chip's memory changes its value due to radiation. In this instance, a logical value of "one" can change to a logical value of "zero" and vice versa. An upset may be generally defined as a mis-stated output of a component. This output may comprise one or more signal bits.

Radiation can also induce a "latchup" of circuits in a chip. Latchup is an electrical condition of a semiconductor in which the output of the device is driven and held at saturation because of the deposition of charge within a semiconductor circuit by the high energy particles. The cause of the latched condition may be only a temporary upset. If power is removed then reapplied, the component may function normally.

The upset rate of a component depends on the construction features of the chip, including its size, operating voltage, temperature and internal circuit design. The upset rate for a particular part can vary from ten per day for a commercial one megabit random access memory chip (RAM), to 1 every 2800 years for a radiation-hardened one megabit RAM. A radiation-hardened component is a device that has been specially designed and built to resist the hazards of radiation. These devices tend to be much more expensive and slower than conventional chips. They typically lag the state-of-the-art by one to three years.

Current computer chips that are utilized in conventional applications on the ground are generally not threatened by cosmic radiation. This immunity is due to the protection offered by the Earth's atmosphere. There are, however, some terrestrial uses of computer chips that are subject to radiation upsets. Trace radioactive material in semiconductor packages can cause an upset. Radiation emitted from diagnostic or therapeutic medical devices can similarly affect semiconductor components. As devices become more complex, secondary and tertiary particles from atmospheric cosmic ray penetration will cause them to suffer upsets.

In their paper entitled *Review of Commercial Spacecraft Anomalies and Single-Event-Effect Occurrences*, Catherine Barillot et al. describe the upset events that have been observed in space since 1975. The events and their origins are traced and analyzed. Data are presented which show that the number of upsets encountered on the TDRS satellite follows the modulation of cosmic rays with the solar cycle.

L. D. Akers of the University of Colorado published a paper concerning upsets entitled *Microprocessor Technology and Single Event Upset Susceptibility*. The author points out that current satellites which employ powerful microcircuits to control every aspect of a spacecraft are increasingly vulnerable to heavy ion induced SEU. He predicts that the advent of microdevices having lower power and higher speed, combined with the expected increase of particles from large solar flares, will result in much higher rates of SEUs. He believes that the designers of small satellites will need to implement SEU mitigation techniques to ensure the success of future satellite missions.

Previous attempts to mitigate the radiation hazards that affect computer chips have met with mixed results. Work relating to fault tolerant computers has principally dealt with error detection at a high level, for example, at the register level. In their paper entitled *Synchronization and Fault-Masking in Redundant Real-Time Systems*, IEEE, 1984, pp. 152–157, C. M. Krishna et al. describe hardware synchronization and software synchronization of a number of phase-locked clocks in the presence of "malicious" failures. The authors describe a simple hardware voting strategy in which the output values of a clock are compared with the incoming signal of a reference clock. Non-faulty clocks are locked in phase. As processors fail, they are replaced by spares if they are available. This method applies to many redundant computers having multiple clocks which operate in close synchrony. Krishna et al. also describe the use of software algorithms to enable a system of many processors with their own clocks to operate in close synchrony.

The software solutions like those utilized by Krishna et al. employ voting procedures at software block levels. These solutions generally involve comparing computer outputs at a high level to see if each separate computer agrees with the others. Such systems pay a heavy price in weight, bulk, cost and power consumed to achieve high levels of redundancy.

Krishna et al. do not address the problem of momentary upset of a system. Nor have the authors addressed the problem of faults limited to within any one component of a processor. The recognition of a fault in a system, such as that described by Krishna et al., means the entire device has failed. But a radiation upset does not necessarily result in a failed device. The upset condition can be temporary.

In a paper entitled *Single Event Upset and Latchup Sensitive Devices in Satellite Systems* published by The Johns Hopkins University Applied Physics Laboratory, Richard M. Maurer and James D. Kinnison recognize the hazard of single event upset and latchup. They offer a decision tree as an aid to eliminating single event effects sensitive parts from a design, or using SEE sensitive parts "as-is" to provide some measure of protection in the design of circuits in which the parts will function.

In their article on *Reliability Modeling and Analysis of General Modular Redundant Systems*, published in IEEE Transactions on Reliability, Vol. R-24, No. Dec. 5, 1975, Francis Mather and Paulo T. de Sousa explain that hardware redundancy has been used to design fault-tolerant digital systems. They describe majority voting of redundant modules and quadded logic (replacement of every hardware gate by four gates) as hardware redundant structures.

E. J. McClusky published a paper entitled *Hardware Fault Tolerance*, in the Sixteenth Annual Institute in Computer Science at the University of California at Santa Cruz, Aug. 25, 1986. McClusky describes the basic concepts and techniques of hardware fault tolerancing. One such technique is "error masking," the ability to prevent errors from occurring at system outputs. Error masking is achieved, according to McClusky, with "massive redundancy." System outputs are determined by the voting of signals that are identical when no failures are present. The usual forms of massive redundancy are triple-modular redundancy, quad components, quadded and voted logic. McClusky reports that voted logic involves connecting all copies of a module to a voter. The outputs of each module are passed through the voter before being transmitted to other parts of the system. Voting is carried on at high level in the entire system. Quadded logic is described as replacing every logic gate with four gates. Faults are automatically corrected by the interconnection pattern of the gates. Such a system would clearly incur weight, power and cost penalties on the system that is being protected from radiation hazards.

While McClusky suggests that triple-modular redundancy can be applied to small units of replication as well as an entire computer, he does not describe how such a scheme might be implemented, except for the use of error correcting codes and certain software programs. Error correcting code methods rely on error correcting circuitry to change faulty information bits and is, therefore, only effective when the error correcting circuitry is fault-free. The software methods cited by McClusky require that several versions of a program be written independently. Each program runs on the same data and the outputs are obtained by voting. Such a technique may be effective for temporary faults, but requires a great deal of time and system overhead.

H. Schmidt et al. discuss the numerous critical issues which must be resolved prior to a detailed design of a reconfigurable computer, such as computers used for real time control systems in *Critical Issues in the Design of a Reconfigurable Control Computer*, IEEE, 1984, pp. 36–41.

In his paper entitled *Fault Tolerant Multiprocessor Link and Bus Network Architectures*, published in the IEEE Transactions on Computers, Vol. 34, No. 1, Jan. 1985, pp 33–45, Dhiraj K. Pardha presents a general class of regular networks which provide optimal or near optimal fault tolerance for a large number of computing elements interconnected in an integrated system.

Earlier high performance processors comprised a number of logic chips, a floating point chip and many memory chips used as local caches. Current processors contain all of these fuinctions in a single chip. This centralization of functions within a single chip permits the application of fault-tolerant methods to just a few chips in a processor system at the chip hardware level. As more and more devices are contained on one substrate, the processor chips become more and more dense. These devices, particularly complementary metal oxide, gallium-arsenide, and bipolar semiconductors devices and others, are then increasingly affected by radiation.

In their book entitled *Reliable Computer Systems*, Second Edition, published by Digital Press in 1992, Daniel P. Siewiorek and Robert S. Swarz discuss error detection, protective redundancy, fault tolerant software and the evaluation criteria involved in reliability techniques. Chapter Three of this text presents a comparison of computer output at the system level, register or transfer level, bus level module level and gate level. The authors describe triple-redundant modules plus voting that isolates or corrects fault effects before they reach module outputs. They also discuss use of back-up spares in a hybrid redundant system. That is, a core of N-modules operating in parallel, with a voter determining system output and with a set of back-up spare modules that can be switched in to replace failed modules in the core. FIG. 3-31 of this text depicts majority voting at the outputs of three module and/or three voters. Siewiorek et al. aver that this technique results in signal delay and decreases in performance. FIG. 3-57 shows the fault tolerant computer of Hopkins, Smith and Lala (1978) implemented from a set of processor/cache, memory and input/output modules, all interconnected by redundant, common serial buses. The computations of the computer are performed in triads: three processor/caches and three memories performing the same operation in voting mode and synchronized at the clock level. Because most processing utilizes the cache, voting is not performed at every clock cycle, but whenever data is transferred over the bus. The authors do not describe a system that includes multiple processors coupled by individual buses to a voter, which has a voter output connected to a single memory. Siewiorek and Swarz do not describe a system whose processor outputs and inputs are voted at each clock cycle. The authors do not discuss means for controlling power to dysfunctional processors as part of such a system.

The development of a fault tolerant computer based on commercially available parts for use in military and commercial space vehicles would offer significant operational and cost advantages. Such an invention would offer higher levels of performance and would cost less to manufacture than existing approaches based on radiation hardened chips. The invention could be used for remotely installed computer systems and other processors that are subjected to random failures or to a radiation environment which produces single event upsets at unacceptably high rates. Such radiation upset protection would discover and correct errors. It would be extremely beneficial if a fault tolerance method could be applied at a very low hardware level, for example, within a processor chip, instead of at the computer register or the output of computer modules. Such a system would fill a long felt need in specialized computer and satellite industries.

SUMMARY OF THE INVENTION

The present invention detects and corrects errors caused by radiation-induced single event upsets (SEU) and other random failures using redundant voting at the hardware clock level. Voting at the hardware clock level refers to comparing data and address signals of a number of central processing units at every clock cycle. In the past, voting techniques have been used at higher system levels in long life space applications. Recent advances in semiconductor technology make it feasible to use redundant voting for non-radiation hardened commercial components at the hardware clock level. The higher integration levels now available allow redundant functions to be implemented for an entire system using only a few devices. Previously, a high performance processor would consist of several logic chips, a floating point chip and many memory chips used as local caches. Today, all these functions are contained in a single chip. Redundant functions can be implemented in one module using this chip and only a few others.

One preferred embodiment of computer architecture which implements this invention comprises a computer containing four commercial, single chip, central processing units (CPUs), a voter, a memory controller and a system memory. An alternative embodiment utilizes three commercial CPUs. The CPUs are operated in strict "lockstep," that is, each operating step of each CPU is accomplished in parallel and substantially simultaneously with the other CPUs. The CPUs are operated in a conventional phase lock loop circuit which maintains the lock. All four CPU outputs are "voted" each CPU clock cycle in a voter, giving rise to the term "quad-voted" for the system. The voter may be radiation hardened. In the voting process, each of the CPU output signals is compared, one with another, by a voter at every clock cycle. The processors share a single system memory and a memory bus. Since the processors are in lockstep, they should all request the same memory access at the same time. Voted addresses are used for access to memory, voted data is written to memory and a system computer (I/O) bus through a memory controller. The correction of errors caused by device "latchup" usually involves the necessity to reduce or remove power to a processing unit or to another component to prevent catastrophic damage because of a latched condition. The voter and memory controller may be implemented in application specific integrated circuits (ASIC). The voter and memory ASICs may be radiation hardened.

The data read from memory and the system I/O bus is supplied to all four processor chips simultaneously. The "reads" from memory are checked using conventional techniques. For example, well known "Hamming codes," implemented in the memory chip hardware, can check and correct a single bit error and detect double bit errors.

The output from each CPU is compared for agreement with the output from all other CPUs. Agreement of a majority of CPU output signals supplied to the voter results in a voted output signal which has the value of the majority. A CPU output signal which does not agree with the majority is detected by the voter, producing an error signal. The error signal is sent to the memory controller which reacts several ways:

1. The majority voted signal is used by the agreeing CPUs to continue CPU processing operations without interruption;
2. The disagreeing CPU is disabled from further participation in voting;
3. A system management interrupt (SMI) is generated to the other CPUs; and
4. At a later time, software initiates a re-synchronization process that recovers the disabled CPU.

In the event of failure of a computer, a spare, error-free computer is substituted. However, the use of the methods and apparatus embodied in this invention are expected to correct the faults described without the need to resort to substitution of a spare computer.

An appreciation of the other aims and objectives of the present invention and a more complete and comprehensive understanding of this invention may be obtained by studying the following description of a preferred embodiment and by referring to the accompanying drawings.

A DETAILED DESCRIPTION OF PREFERRED & ALTERNATIVE EMBODIMENTS

Basic Architecture

Figure 1A:
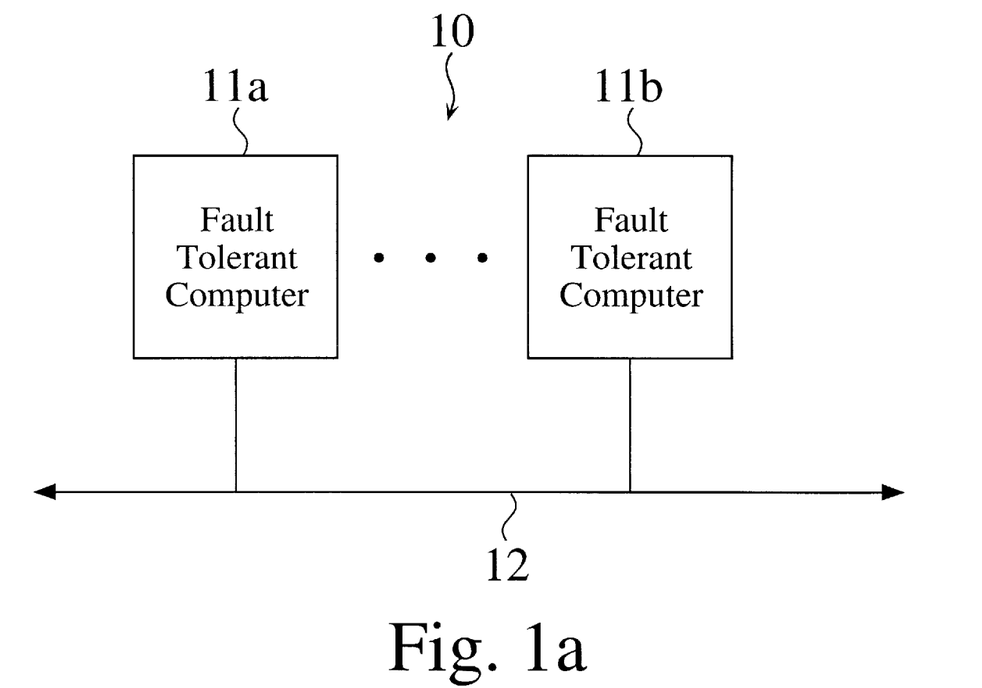
FIG. 1a is a schematic diagram of a computer system showing redundant computers connected to a system computer (I/O) bus.

FIG. 1a presents a top level block diagram of computer system 10 which is designed to tolerate and to manage faults of central processing unit (CPU) components within a computer 1a, b. The computer 11a, b provides data and control signals to a system computer (I/O) bus 12 for operating other devices or recording. The invention "masks" computer errors. These errors are caused by single event upsets (SEU) arising from design and end-of-life faults or radiation. The present invention also tolerates temporary or permanent faults caused by trace radioactive materials (alpha particles) in semiconductor packages, or faults caused by other events such as exposure to diagnostic or therapeutic medical equipment which employ X-rays. An upset does not necessarily indicate a component is faulty. Intermittent or hard failures indicate a faulty component which must be disabled or replaced.

Figure 1B:
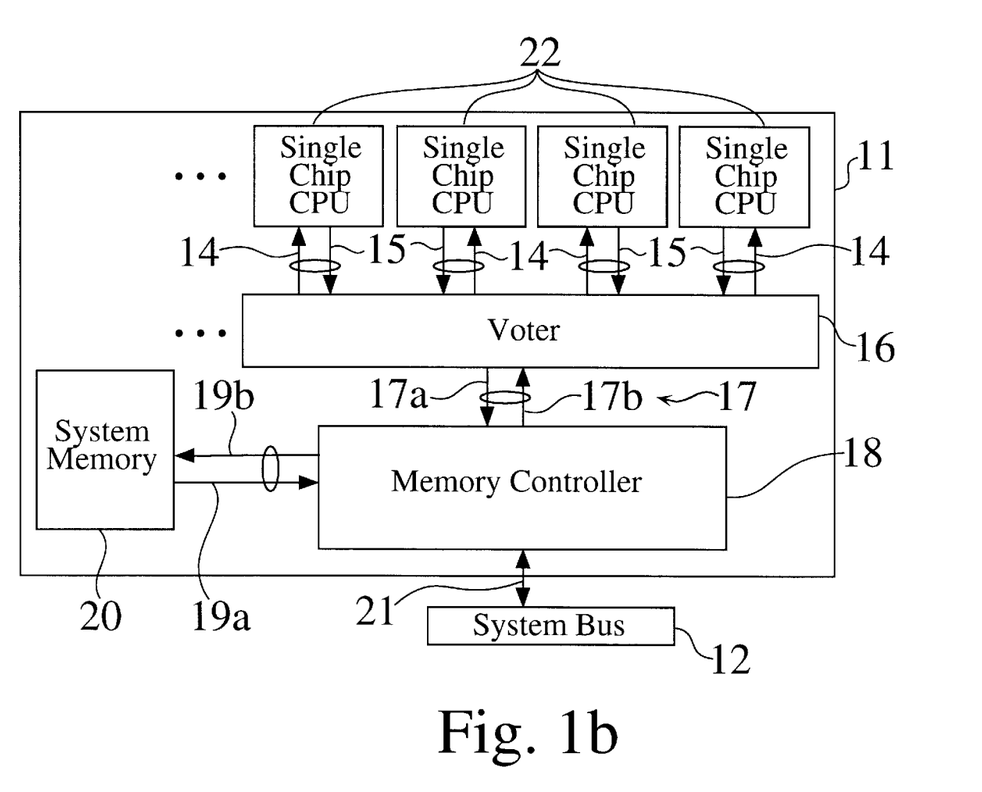
FIG. 1b is a schematic diagram of the invention showing a computer having a plurality of commercial central processor units (CPU) operating in parallel "lockstep" and having their outputs to system memory "voted."

A fault tolerant computer 11 is depicted in FIG. 1b. In this schematic diagram of the invention, at least four commercial central processor units (CPU) 22 are depicted operating in parallel "lockstep." The CPUs are operated in a conventional phase lock loop circuit which maintains the lock. Each operating step of each CPU 22 is accomplished in parallel and substantially simultaneously with the other CPUs 22. All CPU output signals 15 to system memory 20 are passed to a voter 16. The CPU output signals 15 are "voted." When four CPUs are used, this configuration of hardware is referred to as a "quad-voted" system. In the voting process, each of the CPU output signals 15 is compared, one with another, by the voter 16 every cycle of the CPU clock. The CPUs 22 share the single system memory 20 and a CPU bus 17. Since the CPUs 22 are in lockstep, they all request the same memory access at the same time. Voted addresses are used for access to system memory 20. Voted data 17a on the CPU bus 17 is written to memory 20, and supplied to a system computer (I/O) bus 12 through a memory controller 18. The voter 16 and memory controller 18 may be readily implemented in application specific integrated circuits (ASIC). The voter 16 and memory controller 18 may be radiation hardened.

The data signals 19, 21 read from memory 20 and the system I/O bus 12 are supplied to all four CPUs 22 simultaneously. The "reads" from memory 20 are checked using conventional techniques. Well known "Hamming codes," implemented in the memory chip hardware, can check and correct a single bit error and can detect a double bit error.

The output 15 from each CPU 22 is compared for agreement with the output 15 from all other CPUs 22 in the voter 16. Agreement of a majority of CPU output signals 15 supplied to the voter 16 results in a voted output signal 17a which has the value of the majority. A CPU output signal 15 which does not agree with the majority is detected by the voter 16, which then produces an error signal. The error signal is sent to a vote status and control circuit. The circuit may be implemented in the memory controller 18 or the voter 16. The vote status and control circuit reacts in several ways:

1. The majority voted signal is used to continue the CPU operations without interruption;
2. A system management interrupt (SMI) is generated and conveyed to the other CPUs 22; and
3. At a later time, software initiates a re-synchronization process that recovers the disabled CPU 22. If the CPU output signals 15 do not agree as a result of temporary upset, all of the CPUs 22 are re-synchronized by distributing the last-voted CPU internal state equally to all CPUs 22.

The system logic selects the best chance of recovering from a detected fault by re-synchronizing all CPUs 22, by powering down a faulty CPU (22) or by switching to a spare computer 11b and then resetting and re-booting the substituted CPUs.

If the CPU output signal 15 disagreement indicates temporary upset or permanent failure of a CPU 22 when less than three CPUs 22 are operable and less than two CPUs 22 agree, then a spare, error-free computer 11b is substituted and the system is reset (normally by setting all registers to zero) and rebooted. However, use of the techniques embodied in this invention are expected to correct the faults described without the need to resort to substitution of the spare computer 11b. While a second computer forms a part of a preferred embodiment of the invention to provide greater failure tolerance, the reader will recognize that a single surviving computer could carry on the mission after a temporary upset.

To assure that all signals 14 are presented to all CPUs 22 on the same clock cycle, all signals 17b, 21 originating in other parts of the system are synchronized to the system clock in the voter 16 and are driven separately to each CPU 22. Such signals, for example, include resets and interrupts.

Figure 2:
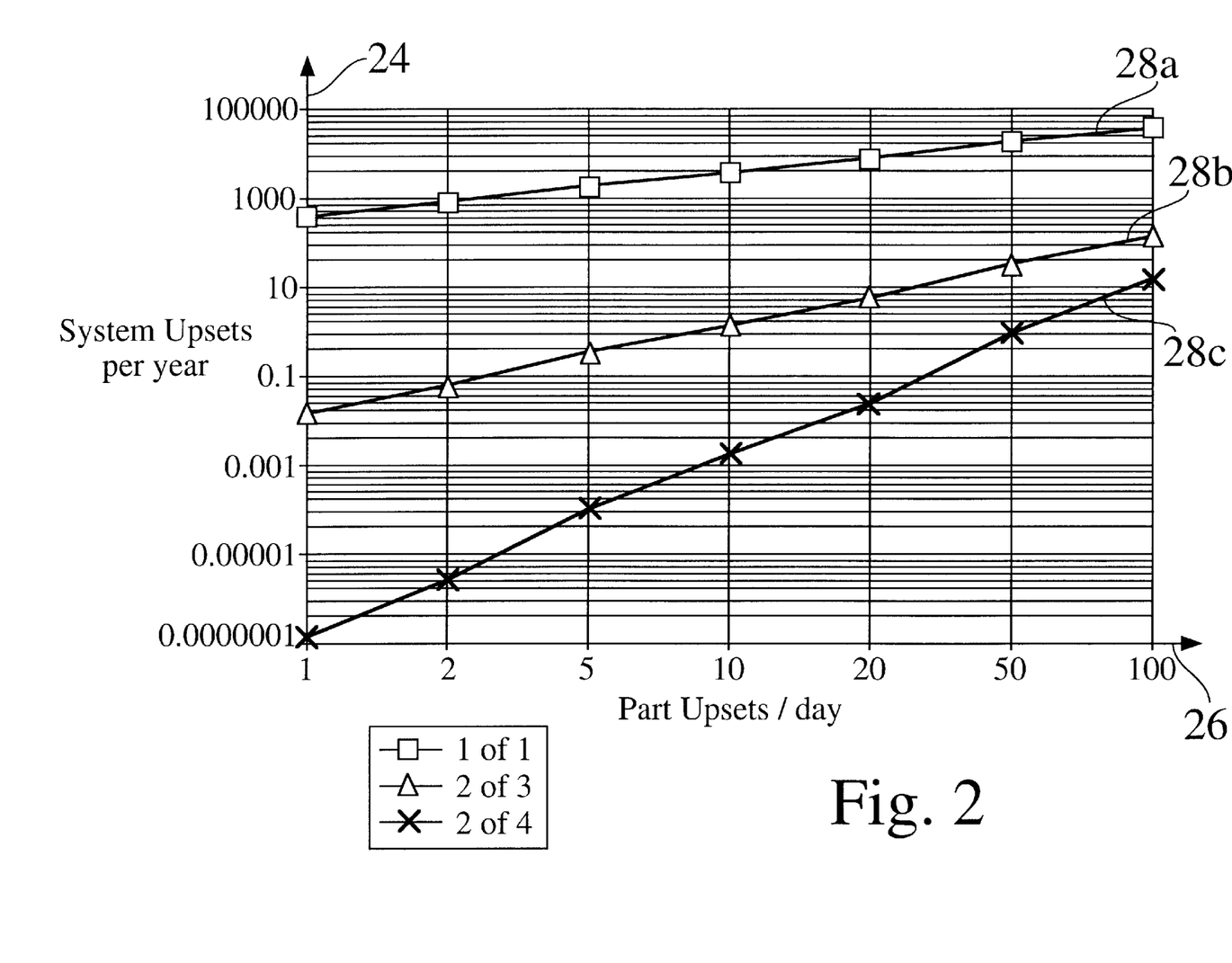
FIG. 2 is a chart which illustrates the number of system upsets per year versus the number of individual part upsets per day for a component whose output is not voted, for components compared by two of three votes, and for a component whose output is compared by two of four votes. The chart shows that system upsets are reduced for voting over non-voting of the output of a component by many orders of magnitude.

FIG. 2 illustrates the number of system upsets that occur per year 24 versus the number of individual part upsets per day 26 for a component whose output is not voted 28a, for components compared by two of three votes 28b, and for a component whose output is compared by two of four votes 28c. For a given number of upsets per day, e.g. ten, the chart shows that system upsets per year are reduced for two-of-four components voted over non-voting of a component's output by about three orders of magnitude ($10^3$). Ten upsets per part per day result in only one system upset in about five hundred years in a two-of-four voter system. Even a two-of-three voter system will exhibit system upsets only a few times per year for the same part upset rate. In the instant invention, four voting components are available unless one of the four CPUs 22 fails permanently. The two-of-four voting set starts out with four members, but degrades to a two-of-three set as soon an any member faults. A half second average time to re-synchronization has been used for the upset calculation, consistent with recovery within a one second major cycle time of a satellite control software system. In many cases, a shorter cycle time is possible, resulting in even lower system upset rates.

A Fault Tolerant Computer

Figure 3:
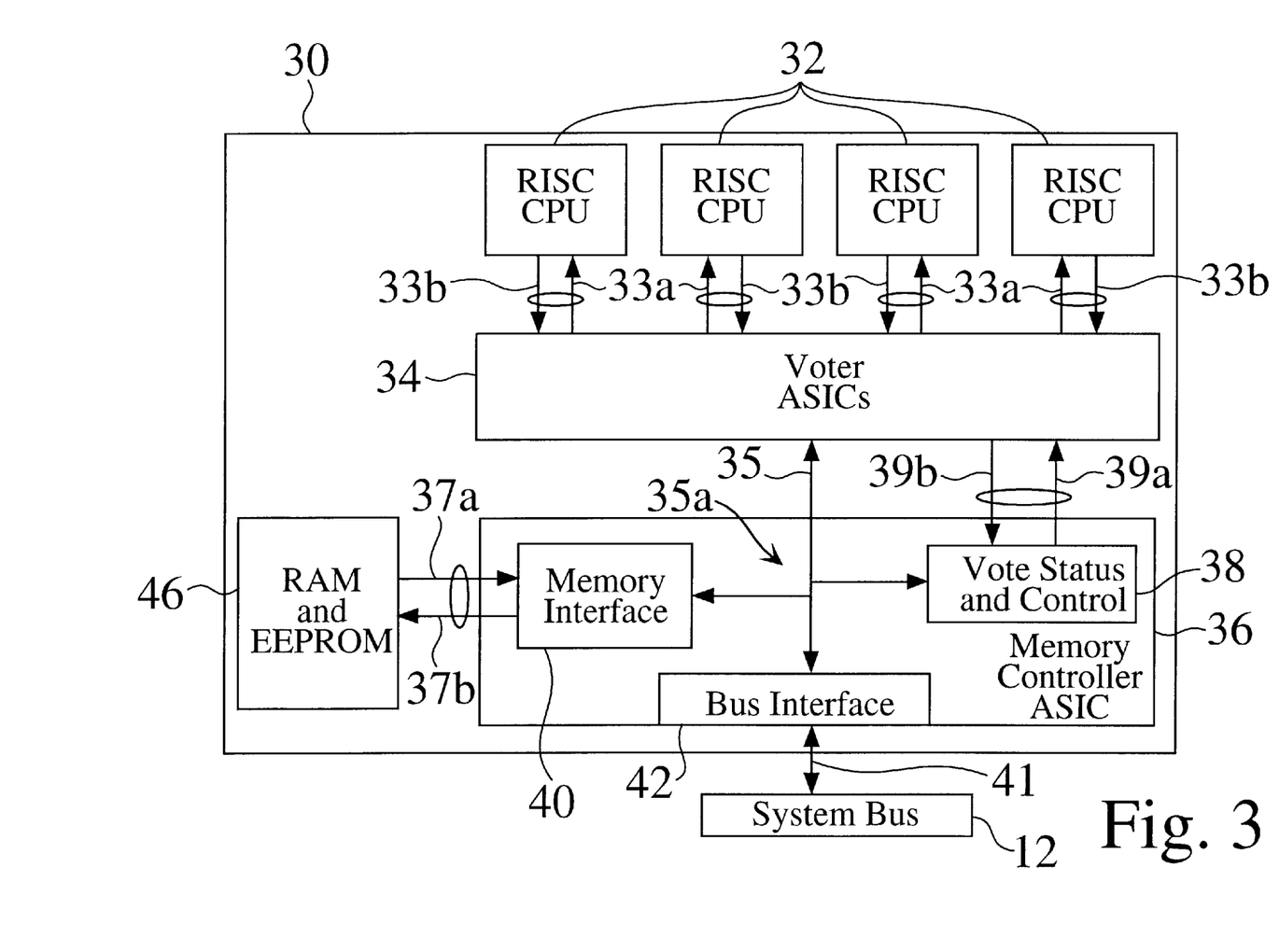
FIG. 3 is a block diagram of one preferred embodiment of a computer using commercial, non-radiation hardened CPUs, which implements the present invention.

FIG. 3 shows further detail of an implementation of a preferred embodiment of a fault tolerant computer 30. In one preferred embodiment, the computer 30 has a plurality of four commercial CPUs 32 operating synchronously. However, the number of CPUs 32 utilized may vary upwards from at least three, depending upon the fault tolerance the user would find acceptable. The CPUs 32 shown in FIG. 3 are reduced instruction set computer chips (RISC). RISC chips are preferred since they contain high-speed memories and require less overhead than other usable CPU chips. The computer 30 includes a voter 34 which is depicted as implemented in an application specific integrated circuit (ASIC). In an alternative embodiment, the voter 34 may consist of field programmable gate arrays. The voter 34 is coupled to each of the CPUs 32. The voter 34 is coupled to a memory controller 36 which contains a vote status and control circuit 38. The memory controller 36 is shown as implemented in a separate ASIC from the voter 34. Although pin count limitations may result in two or more IC's for the voter 34 and memory controller 36, they both may be of a single design.

FIG. 3 also depicts a memory 46 which receives voted CPU signals 35 through a memory interface 40. The voted CPU signals 35 also are also sent to the system computer (I/O) bus 12 through a bus interface 42. The memory 46 provides memory output signals 37a to the memory controller 36 through memory interface 40. The memory output signals 37a are distributed equally as input signals 33a to each of the CPUs 32 through the memory controller 36 and the voter 34 via the CPU bus 35a.

The plurality of CPUs 32 provide CPU output signals 33b as input to the voter 34 for comparison. The CPU output signals 33b which agree by majority vote in the voter 34 emerge from the voter 34 as a voted output signal 35 having the value of the majority. The voted output signal 35 provided by the voter 34 as an input signal 37b to the system memory 46 is also provided to the vote status and control circuit 38 and to the system computer (I/O) bus 12.

Any CPU output signals 33b which do not agree with a majority of CPU output signals 33b are detected by the voter 34. An error signal 39b is then produced by the voter 34 and is sent to the vote status and control circuit 38. The majority voted signals 35 are used by the agreeing CPUs 32 to continue processing operations without interruption. The vote status and control circuit 38 reacts to the error signals 39b by generating a system management interrupt. At a later time, in reaction to the system management interrupt, software initiates re-synchronizing of the plurality of CPUs 32 when the error is caused by a single event upset. The vote status and control circuit 38 reacts to error signals 39b caused by failure of a CPU 32, to agree with a majority when less than three CPUs 32 are operable and less than two of the plurality of CPUs 32 agree, by substituting an error-free computer 30 for the dysfunctional computer 30 into the computer system 10. A conventional control circuit named "reconfiguration unit," not shown in FIG. 3 for simplification purposes, accomplishes the switching procedure.

Fault Detection

Figure 4:
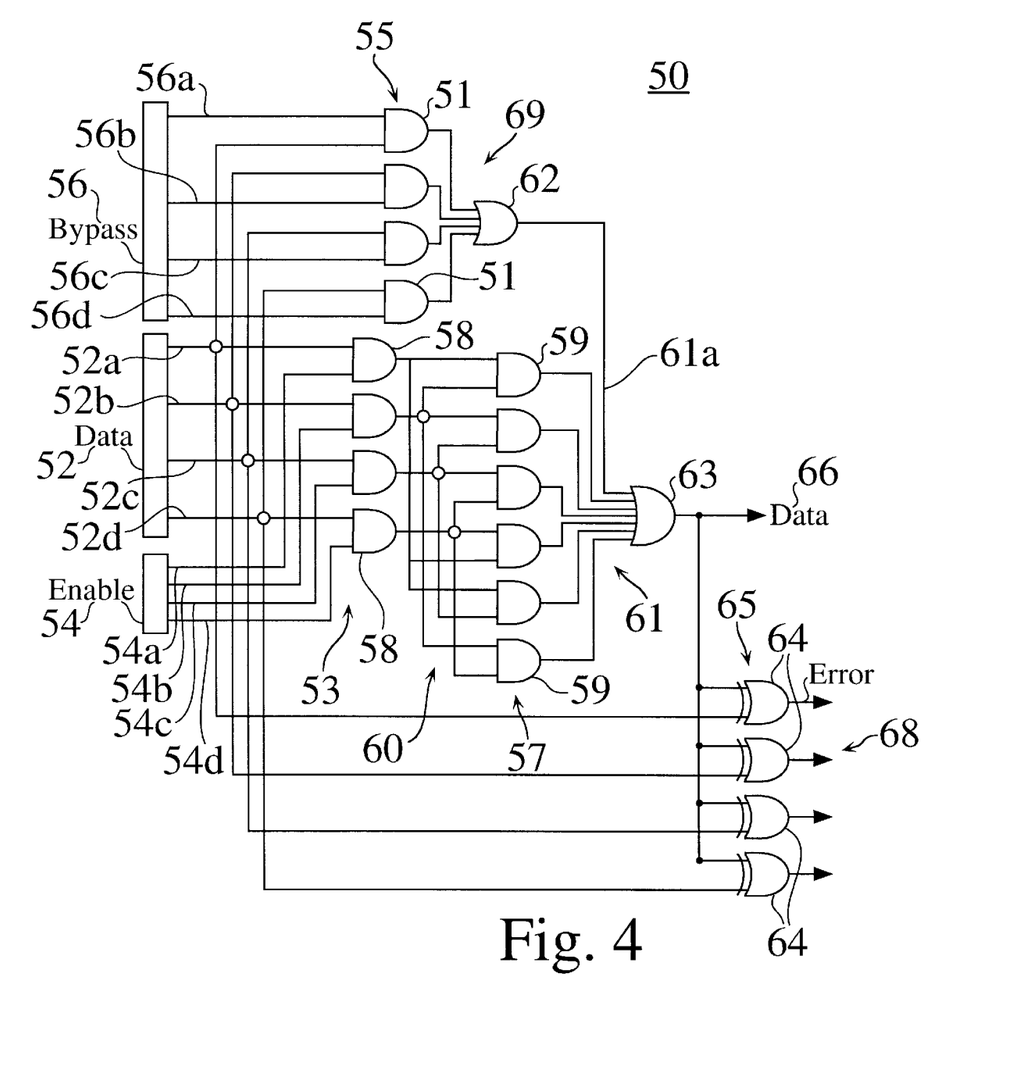
FIG. 4 is a schematic diagram of one type of circuit for a voter which implements the "quad voting" method illustrated in FIGS. 1b and 3.

Fault detection takes place in the voter 34. FIG. 4 depicts a typical gate array 50 in the voter 34 which accomplishes the voting. A gate array 50 for data signals 52, derived from CPU output signals 33b, is illustrated. A similar gate array is used to obtain voted address signals and voted control signals. These signals are also derived from the CPU output signals 33b. The gate array 50 includes a first AND gate array 53, a second AND gate array 57, a first OR gate 63 and an array of exclusive OR gates 65. These gate arrays compare the CPU output signals 33b, present a voted output to the memory bus and I/O bus and detect an erroneous output 33b from a CPU 32. The voter 34 may also include a bypass gate array 55 which is used to test the system. The bypass gate array 55 comprises parallel AND gates 51 and an OR gate 62. The bypass gate array 55 may also be employed as an override of the voter 34 in the event it is desired to operate the system 10 when only one functional CPU 32 remains in operation.

In the circuit illustrated, each first AND gate 58 of the first AND gate array 53 has as a first input 52a–d, a CPU output signal 33b which is a data signal 52. It has as a second input 54a–d a vote status and control signal 39a which is an enable signal 54. Each first AND gate 58 has an output 60. Each gate 59 of the second AND gate array 57 has as a first input, an output 60 from one gate 58 of the first AND gate array 53 and has as a second input, an output 60 from another gate 58 of the first AND gate array 53. Each second AND gate 59 has an output 61.

The first OR gate 63 has as input, the output 61 of each gate 59 of the second AND gate array 57, and has an output 66. The bypass gate array 55 also provides an output 61a to the first OR gate 63.

Each gate 64 of the exclusive OR gate array 65 is coupled to the output 66 of the first OR gate 63. Each one of the exclusive OR gates 64 in the array 65 is coupled respectively to each of the data signals 52 and has an output 68.

The data signals 52, input to a first terminal of the first AND gate array 53, emerge as outputs 60 from the array 53 by application of a respective enable signal 54 to a second input terminal of a corresponding gate of the array 53. The outputs 60 are compared, one to another, in the second AND gate array 57. Outputs 61 from the second AND gate array 57, which are not in agreement with the value of the other data signals 52 input to the first AND gate array 53, will be at a logical value of zero. Outputs 61 will be the logical AND for those data signals 52 which are in agreement with other data signals 52 and have the value of those data signals 52.

The output 66 from the first OR gate 63 has a value of the agreeing data signals 52 which emerge as outputs 61 from the second AND gate array 57. The output 66 from the first OR gate 63 is applied to a first input of each gate 64 of the exclusive OR gate array 65. The data signals 52 are applied to a second input of each gate 64 of the exclusive OR gate array 65. An error signal 68 indicating an upset or fault is generated by each gate 64 of the exclusive OR gate array 65 when the applied data signal 52 and the applied output 66 from the first OR gate 63 do not agree.

As FIG. 4 shows, each CPU output signal 33b appearing as a data signal 52 can be bypassed around the voting process by applying a bypass signal 56 to one terminal of a gate 51 in the bypass gate array 55. The data signal can be excluded from voting, i.e., disabled, by removing the enable signal 54 from the input line 54a–d to its respective gate. If only one CPU 32 is enabled, and the rest are disabled, then the voter data output 66 will follow that bypassed CPUs output 33b. If more than one CPU 32 is enabled, then the data output 66 will be the logical OR of all bypassed CPU outputs 33b. If a CPU 32 is both bypassed and disabled, then its output 33b will be presented to the OR gate 63. Similar bypassing takes place for address signals at the same time.

Fault Correction

Figure 5:
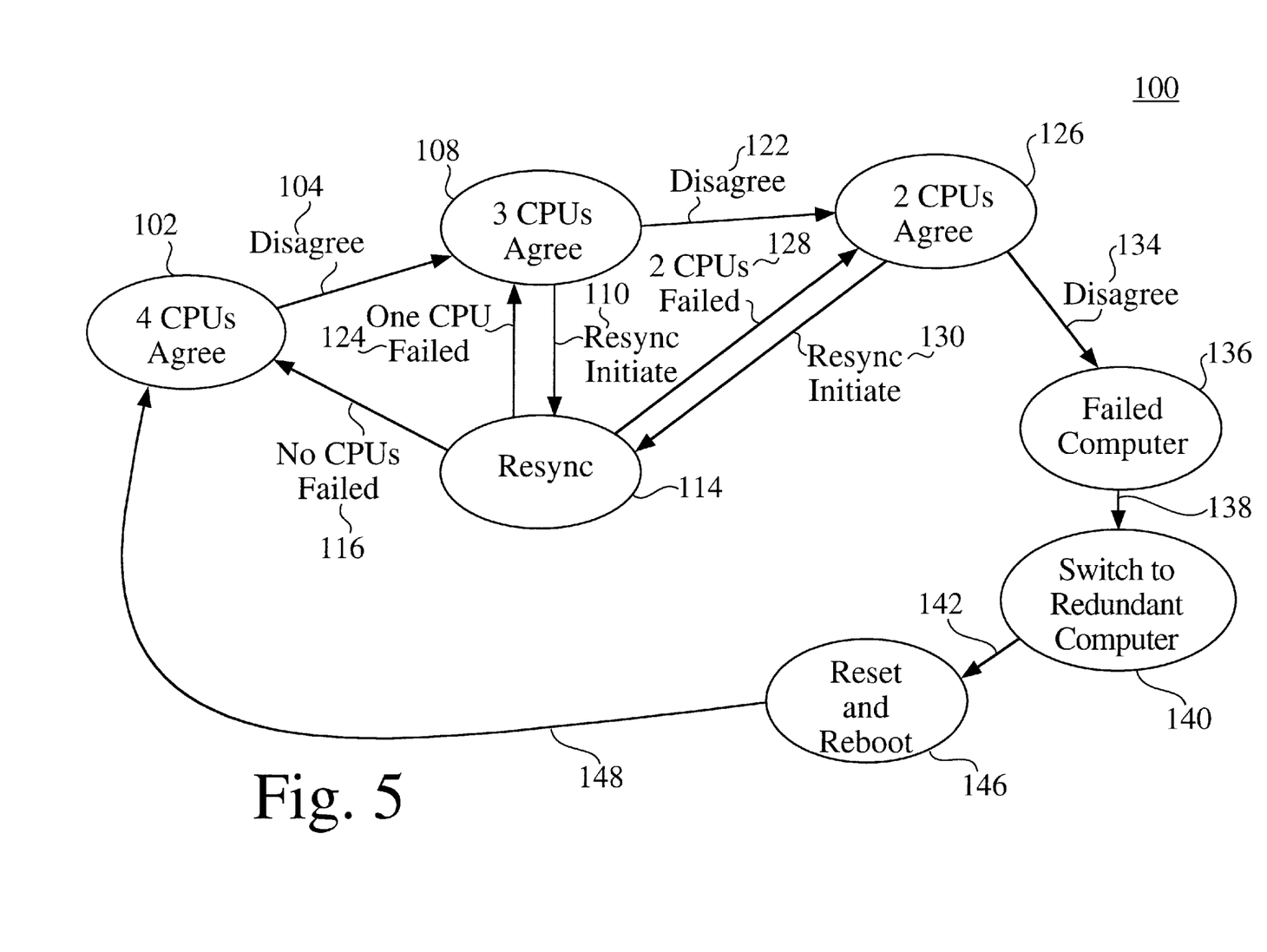
FIG. 5 depicts a state diagram of the instant invention showing system reaction to a fault detection and its correction.

FIG. 5 depicts a state diagram 100 for one of two redundant computers 30 of the instant invention which has four CPUs 32. It shows system reaction to a fault detection and correction of the fault. When one CPU 32 of this embodiment is upset or suffers a failure, the computer 30 can still be operated with the remaining three CPUs 32. If a second CPU 32 is temporarily upset, the computer 30 will continue to function with two CPUs 32 in agreement, and all of the CPUs 32 will be resynchronized to bring all four CPUs 32 into agreement. The logic of this preferred embodiment operates to substitute a spare computer 30 for the dysfunctional computer 30 in the event of permanent failure of two CPUs 32 and the upset of a third. The logic is principally controlled by software running in the CPUs 32 except that the voter 34 and vote status and control circuits 38 will move a CPU from an enabled and voting state to a disagree and disable state when a disagreement is detected.

Compared to an "unvoted" part or component, a voting set of three CPUs 32 can give correct outputs even if one of the members has been upset and is not working correctly. While in this condition in which one of three CPUs 32 is not working, an upset of one of the other two CPUs 32 will result in a system upset, since a majority vote must be unanimous if there are only two valid voters. Once a CPU 32 is upset, it may continue to behave differently than the other CPUs, 32 due to the complexity of the internal machine state. To restore a faulted CPU 32 to the voting set requires a re-synchronization. The system upset level depends on both the upset rate of individual CPUs, 32 and the average length of time before a resynchronization is initiated.

The diagram of FIG. 5 illustrates the system logic. CPU states are shown in the closed boxes. Transitions from one state to another are depicted by the lines, the arrow heads indicating the direction of the transition. The computer 30 begins in a state of "four CPUs agree" 102. If one CPU output 33b is in disagreement with the other three CPUs 32, then an error signal indicating disagreement is generated by the voter 34 as described above. The computer 30 transitions 104 to "three CPUs agree" 108.

When the computer 30 transitions 104 to state 108, an interrupt is generated to the CPUs 32 requesting that a re-synchronization be performed. From the "three CPUs agree state" 108, the computer 30 transitions 110 through the "resynchronization state" 114. The computer 30 then transitions 116 to state 102, transitions 124 to state 108, or transitions 128 to state 126, depending on how many CPUs 32 have either failed permanently or are unpowered and cannot be brought into agreement during the "re-synchronization state" 114.

While the computer 30 is in the "three CPUs agree state" 108, if a disagreement is detected among the three voting CPUs 32, then the disagreeing CPU 32 is disabled and the computer transitions 122 to "two CPUs agree state" 126. When in transition 122 to state 126, a system management interrupt is generated to the CPUs 32 requesting that re-synchronization be performed. From "two CPUs agree" state 126, the transition 130 through re-synchronization 114 will return the computer 30 to state 102, 108, or 126, depending upon how many of the CPUs 32 have failed pennanently or are unpowered and cannot be brought into agreement during the "re-synchronization state" 114.

While the computer is in "two CPUs agree state" 126, should a disagreement be detected among the two voting CPUs 32, the computer 30 will transition 134 to a "failed computer state" 136.

Upon reaching the "failed computer state" 136, the computer 30 indicates a failed condition to the reconfiguration unit and a transition 138 is made to "switch to an error-free redundant computer state" 140. The switch being made, the computer 30 is reset (normally all registers go to zero) and the system 10 is rebooted with the error-free, redundant computer 30. The substitute computer 30 then transitions 148 to a "four CPUs agree" state 102.

CPU State Control

Individual CPUs 32 can be in any one of the following states:

1. Enabled and voting;
2. Commanded disabled;
3. Disagreeing, disabled;
4. Bypassing;
5. Re-synchronizing; or
6. Power down.

In one embodiment of the invention, an application specific integrated circuit (ASIC) 34 supports a powered down CPU 32 by insuring that interface pins to the CPU 32 are driven to a non-stressed condition. Controlling the stress on a device when power is interrupted prevents the degradation of its reliability.

Figure 6:
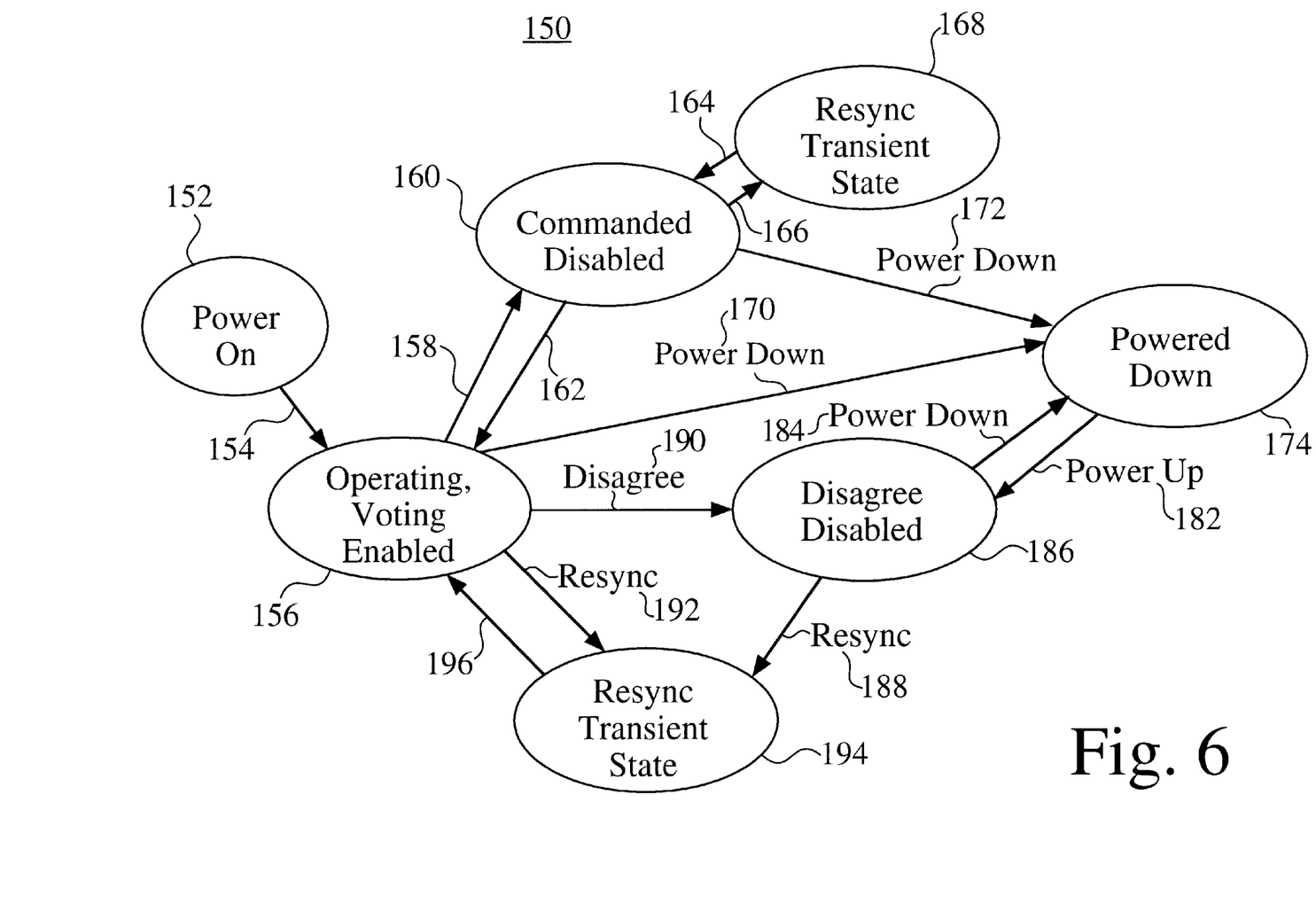
FIG. 6 is a CPU control state diagram which shows the various states of an individual processor when powered on, disabled by command or by an upset, and the transitions from one state to another

The vote status and control circuit 38 prevents direct movement from a power down state 174 to an enabled and voting state 156 by always placing a CPU 32 in the disagree, disabled state 186 when leaving the power down state 174.

The CPU control and status signals 39a, 39b generated during operation of the computer 30 are:

1. Error signal 68 from the voter 34, one for each CPU 32;
2. Enable signal 54 and bypass signal 56 to the voter 34 from the vote status and control circuit 38, one for each CPU 32;
3. System management interrupt and reset signal to each CPU 32 from the vote status and control circuit 38; and
4. Power on/off signal to the power control circuit of each CPU 32.

Both the system management interrupt and reset signals pass through the voter 34 for clock synchronization. The static state of control signals for each CPU 32 state is shown in Table One:

TABLE ONE

| State | CPU State Control Signals | | | |
|---|---|---|---|---|
| | Enable | Bypass | Reset | Power |
| Enabled and voting | Enabled | Off | Inactive | On |
| Commanded Disabled | Disabled | Off | Inactive | On |
| Disagreed, Disabled | Disabled | Off | Inactive | On |
| Bypassing | — | On | Inactive | On |
| Powered Down | — | — | — | Off |
| Re-synchronizing | — | — | Active | On |

FIG. 6 is a CPU state control diagram 150 which shows the various states of an individual CPUs 32 when powered on, disabled by command or by an upset and the transitions from one state to another. In this diagram, CPU states are shown in closed boxes and transitions from one state to another are depicted as lines. The direction of the transition is shown by the arrowheads. The cycle begins with a power on command 152. Each CPU 32 in the computer 30 then transitions 154 to the "voting and enabled state" 156. Each CPU 32 in the computer 30 may be disabled by command from the software by transition 158. The disable command may be used to conserve power for long missions or low bus power. This command may be useful for conserving power aboard a satellite when solar flare activity is relatively low and the number of upsets encountered is diminished. If power is at a premium, reduction of power may be preferable to full fault tolerance. The computer 30 may also be disabled when a permanent failure is recognized or suspected. The "commanded disabled state" 160 may be reversed by transition 162. From the "commanded disabled state" 160 the CPUs may be re-synchronized and return to the "commanded disabled state" 160, as indicated by the transitions 166, 164 to and from the "re-synchronize state" 168.

A CPU may be moved via transition 170 to a "powered down state" 174 from the "voting and enabled state" 156 or via transition 172 from the "commanded disabled state" 160. A CPU 32 may be powered down by transition 184 from a "disagree, disabled state" 186. The "disagree, disabled state" 186 is achieved by transition 190 from the "operating, voting enabled state" 156, caused by an error signal 68 resulting from an upset. If the upset CPU can be restored to operation, a transition 188 to the "re-synchronize transient state" 194 is made. The CPUs 32 are re-synchronized and returned to the "operating, voting enabled state" 156 by transition 196. When a CPU 32 has failed to re-synchronize after a disagreement and a subsequent re-synchronization, a latchup is suspected. Power is then removed and reapplied to the CPU 32 to clear the latchup. From the "powered down" state 174, a CPU 32 can be restarted by a power up transition 182 through "the disagree, disabled state" 186.

Re-synchronize Operation

Figure 7:
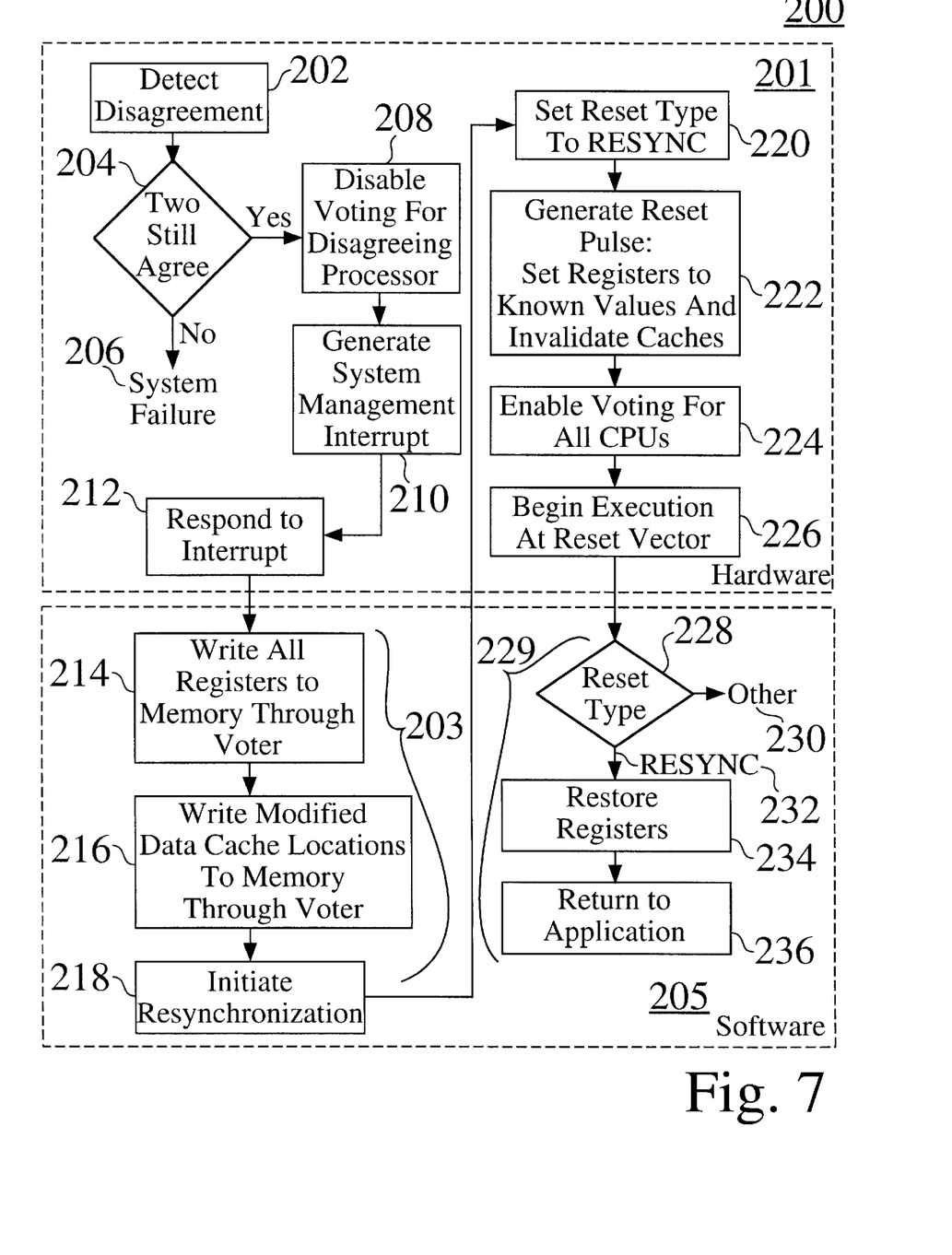
FIG. 7 is a flow chart which depicts the hardware and software which resynchronize the CPUs and recover from an error.

The re-synchronize operation 194 is commanded by software running in the CPUs 32. When the command is received, all CPUs 32 are placed in "reset." Any CPUs 32 that are in the "disagree, disable state" 186 (in respect of voting) are returned to the "operating, voting enabled state" 156. If a CPU 32 was "commanded disabled" 160 (or in bypassing state) it remains in that condition after the "resynchronize transient state" 168. The re-synchronize operation is illustrated in FIG. 7.

CPU Reset

When power is first applied 152 to the computer 30, all CPUs 32 are powered, operating and voting enabled 156.

When a CPU transitions 190 to a "disagree, disabled state" 186, a system management interrupt (SMI) is generated in the vote status and control circuit 38 and sent to the CPU 32. The SMI begins a resynchronization sequence. An interrupt service software program initiates a transition 188 to a re-synchronization operation 194.

Error Correction bus; Re-synchronizing the CPUs

FIG. 7 is a flow chart 200 which portrays the hardware 201 and software 205 actions which re-synchronize the CPUs 32. A portion of the process takes place in hardware 201, principally the CPU 32, the voter 34 and vote status and control circuit 38. The other operations are controlled by software 205 running in the CPUs 32. The error correction process begins when a disagreement of a CPU 32 with the majority of other CPUs 32 is detected 202 by the voter 34. If no two operating CPUs 32 agree 204, the system is considered to have failed 206. In such event, a system restart with a substituted spare computer 30, will be attempted. All software will be restarted, but a major disruption of computer functions will occur.

If an error is detected, and two or more CPUs 32 still agree 204, the disagreeing CPU 32 is disabled 208 from participating in voting. A system management interrupt (SMI) is generated 210 by the hardware. The SMI generates a flag indicating re-synchronization will be needed shortly, though not immediately. The application software program continues without interruption. Disabling the disagreeing CPU 32 avoids corruption of the voting process, allowing detection of any additional upsets or failures in the remaining CPUs 32. Shortly thereafter, as determined by the interrupt enable and priority settings of the CPUs 32, the system responds 212 to the system management interrupt 210. As part of this response 212, the software status, including the point at which the currently executing program was interrupted, is saved to the memory 46. This information is used later to resume the interrupted program at the exact point at which it was terminated.

The interrupt service software program 203 will write 214 all of the CPU registers to memory 46 through the voter 34. Since at least two CPUs 32 agree, the registers contain correct values and the saved values will be error-free. During the re-synchronizing process, these values will be reloaded into all the CPUs 32, replacing any erroneous values in the disagreeing CPU 32. The interrupt service software program 203 will force any locations in the data cache that were modified by the CPU 32, but not yet written into memory 46 through the voter 34, to be written 216 into memory through the voter 34. If various CPUs 32 have different values in their caches, the voting process assures that the memory 46 has only correct values.

The interrupt service software program 203 then initiates re-synchronization 218 and begins a hardware sequence. First, as shown in FIG. 7, the reset type is set 220, to re-synchronization and the reset type information is held in a dedicated register. Other reset types, include majority fail, power up and external signal. Second, a reset pulse is generated 222 and sent to all CPUs 32. Within each CPU 32, the reset pulse causes the registers in all CPUs 32 to be set to the same value, usually zero. The reset pulse also causes the contents of all CPU caches to be discarded. New data must be read from memory 46 before the CPU caches can be used. Voting is then enabled 224 for all CPUs 32 that were disabled 208. Finally, after all the reset functions are complete, all CPUs 32 have the same machine state and are operating identically once more. The CPUs 32 begin program execution 226 from a special address called a reset vector.

The reset service software 229 that resides at the reset vector address looks at the reset type register and determines 228 the type of reset that occurred. Because in the example, the reset type was set 220 to indicate re-synchronization 232 of the CPUs 32, the software 229 will reload the CPU register data, written previously to memory 46, into the CPU registers. All CPUs 32 receive the same value since the voting process allowed only one set of values to be saved to memory 46. The information which characterizes the machine state at the time the system was interrupted is restored 234 to the registers. Reset service software 229 executes a "return from interrupt" process which returns 236 to the original application program at the point which it was terminated.

The CPU caches whose contents were discarded by the reset pulse fill with new data as the program proceeds. Because of their dynamic nature, the cache contents may not be the same as if there had been no disagreement, but the caches in all CPUs 32 will be identical.

Other than the time delay needed for the re-synchronization process, the original application program is not affected in its operation or results by the disagreement and subsequent re-synchronization process.

CONCLUSION

Although the present invention has been described in detail with reference to a particular preferred embodiment and alternative embodiments, persons possessing ordinary skill in the art to which this invention pertains will appreciate that various modifications and enhancements may be made without departing from the spirit and scope of the Claims that follow. The various circuits and components that have been disclosed above are intended to educate the reader about preferred embodiments, and are not intended to constrain the limits of the invention or the scope of the Claims. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

FIGS. 1a and 1b
10 Fault tolerant computer system
11a–b Fault tolerant computer
12 System computer (I/O) bus
14 CPU input signals
15 CPU output signals
16 Voter
17 CPU bus
17a Voted output
17b System inputs to voter
18 Memory controller
19a Memory output signals
19b Memory input signals
20 System memory
21 System bus input/output
22 Commercial central processing units (CPU)
FIG. 2
24 System upsets-per-year axis
26 Part upsets-per-day axis
28a Upset rate for an unvoted component
28b Upset rate for a vote of two of three components
28c Upset rate for a vote of two of four components
FIG. 3
12 System computer (I/O) bus
30 Computer 32 Reduced instruction set computer (RISC) central processing unit
33a CPU input signals
33b CPU output signals
34 Voter-application specific integrated circuits (ASIC)
35 Input/output signals to memory interface and system bus interface
36 Memory controller-application specific integrated circuit
37a Output signals from system memory
37b Input signals to system memory
38 Vote status and control circuit
39a–b Vote status and control circuit input/output signals
40 Memory interface circuit
41 Input/output signals to system bus
42 System computer (I/O) bus interface circuit
46 System memory (random access {RAM} and electronically erasable programmable memory {EEPROM})
FIG. 4
50 Gate array
51 Bypass AND gate
52 CPU data signal
52a–d Data lines
53 First AND gate array
54 Enable signal from vote status & control circuit
54a–d Enable signal lines
55 Bypass gate array
57 Second AND gate array
58 First AND gate
59 Second AND gate
60 First AND gate output
61 Second AND gate output
61a Bypass gate array output
62 Second OR gate
63 First OR gate
64 Exclusive OR gate
65 Exclusive OR gate array
66 Data signal to memory and bus interfaces
68 Error signals to vote status and control circuit
69 Bypass AND gate output
FIG. 5
100 Fault detection and reaction state diagram
102 "Four CPU's agree" state
104 One CPU's signals disagree
108 "Three CPU's" agree state
110 Initiate re-synchronization
114 CPUs re-synchronized
116 All CPU signals agree (no CPUs failed)
122 One CPU disagrees
124 One CPU failed
126 "Two CPtJs agree" state
128 Two CPU's failed
130 Initiate re-synchronization
134 CPU signals disagree
136 "Failed computer" state
138 "Failed computer" state declared
140 "Switch to redundant computer" state
142 Redundant computer enabled signal
146 CPUs reset and system rebooted
148 Four CPU signals agree
FIG. 6
150 Processor control state diagram
152 "System power on" state
154 System enable signal
156 "CPUs operating, voting enabled" state
158 Disable operation signal
160 "CPU commanded 'disabled'" state
162 CPUs operating signal
164 CPUs re-synchronized signal
166 Re-synchronize CPUs signal
168 "CPUs re-synchronized" transient state
170 Power down signal
172 Power down signal
174 "CPU powered down" state
182 Power up CPU signal
184 Power down CPU signal
186 CPUs disagree, disable erroneous CPU
188 Re-synchronize CPUs signal
192 Re-synchronize CPUs signal
194 "CPUs re-synchronize" transient state
196 CPUs re-synchronized signal
FIG. 7
200 Flow diagram of re-synchronization sequence for hardware and software
201 Hardware used for re-synchronizing
202 Detect CPU disagreement
203 Interrupt service software program
204 "Two CPUs still agree?"
205 Software used for re-synchronizing
206 System Failure
208 Disable voting for disagreeing CPU
210 Generate system management interrupt (SMI)
212 Respond to SMI
214 Write all registers to memory through voter
216 Write modified data cache locations to memory through voter
218 Initiate re-synchronization sequence
220 Set re-synchronization type to "Re-synchronization"
222 Generate reset pulse, set registers to known values, discard cache contents
224 Enable voting for all CPUs
226 Begin execution at Reset vector
228 "Reset type?"
229 Reset-service software program
230 Initiate other sequence
232 Re-synchronize CPUs
234 Restore registers
236 Return to current application program

What is claimed is:

1. A fault tolerant computer system (10) comprising:

a plurality of central processing units (CPUs) (22) operating synchronously, each operating step of each of said plurality of CPUs (22) being accomplished in parallel and substantially simultaneously with each of the other of said plurality of CPUs (22) each clock cycle of said CPUs (22); each of said plurality of CPUs (22) having a plurality of CPU inputs (14) and a plurality of CPU outputs (15);

a voter (16) coupled to each said plurality of CPU inputs (14) and each said plurality of CPU outputs (15);

said voter (16) using redundant voting of said plurality of CPU outputs (15) to detect errors and failures in any one of said plurality of CPUs (22) whose plurality of CPU outputs (15) disagrees with said plurality of CPU outputs (15) of a majority of said plurality of CPUs (22);

each said plurality of CPU outputs (15) being compared one with another by said voter (16) each said clock cycle;

a system bus (12);

a first computer (11a); said first computer (11a) including said plurality of CPUs (22) and said voter (16) and coupled to said system bus (12);

said first computer (11a) further including a system memory (20);

a memory controller (18); said memory controller (18) coupled to said voter (16), said memory (20) and said system bus (12);

said system memory (20) providing memory output signals (19a) to said memory controller (18); said memory output signals (19a) being distributed equally as said plurality of CPU inputs (14) to each of said CPUs (22) through said memory controller (18) and said voter (16);

agreement in said voter (16) of a majority of said plurality of CPU outputs (15) resulting in a voted output signal (17a); said voted output signal (17a) having a value of said majority of said plurality of CPU outputs (15);

disagreement of any one of said plurality of CPU outputs (15) with a majority of said plurality of CPU outputs (15) being detected by said voter (16), an error signal produced by said disagreement causing resynchronizing of said plurality of CPUs (22) in said first computer (11a);

a gate array(50);

said gate array(50) including a first AND gate array (53); each gate (58) of said first AND gate array (53) having as a first input (52a-d), CPU signals (52) derived from said plurality of CPU outputs (15), and having as a second input (54a–d), enable signals (54) derived from a vote status and control signal (39a); each said gate (58) having an output (60);

a second AND gate array (57); each gate (59) of said second AND gate array (53) having as a first input, an output (60) from one gate (58) of said first AND gate array (53) and having as a second input, an output (60) from another gate (58) of said first AND gate array (53); each said gate (59) having an output (61);

a first OR gate (63) having as input said output (61) of each said gate (59) of said second AND gate array (57), and having an output (66);

an array of exclusive OR gates (65) coupled to an output (66) of said first OR gate (63) and coupled respectively to each of said CPU signals (52); each gate (64) of said array of exclusive OR gates (65) having an output (68);

each of said CPU signals (52) input to said first AND gate array (53) being output by application of each of said enable signals (54) to a corresponding gate of said first AND gate array (53); said output (60) of said first AND gate array (53) being compared, one to another in said second AND gate array (57);

each of said outputs (61) from said second AND gate array (57) having a value of the majority of said CPU signals (52) which are in agreement;

said signals (52) which emerge as outputs (61) from said second AND gate array (57) being output (66) from said first OR gate (63); said first OR gate output (66) having a value of said CPU signals (52) which agree;

said output (66) from said first OR gate (63) being applied as a first input to each gate (64) of said exclusive OR gate array (65) and said CPU signals (52) being applied, respectively as a second input to each gate (64) of said exclusive OR gate array (65); and an error signal (68) being output from each gate (64) of said exclusive OR gate array (65) where said applied CPU signals (52) and said applied output (66) from said first OR gate (63) do not agree.

2. The fault tolerant computer system (10) as claimed in claim 1 in which said gate array (50) further comprises:

a bypass AND gate array (55); each gate (51) of said bypass AND gate array (55) having as a first input said CPU signals (52) and having as a second input a bypass signal (56); each gate (51) of said bypass AND gate array (55) having an output (65) when enabled by said bypass signal (56);

a bypass OR gate (62) having as input said output (69) of said bypass AND gate array (55), and having an output (61a) which is fed to said first OR gate (63);

each of said CPU signals (52) input to a gate (51) of said bypass AND gate array (55) being output to said bypass OR gate (62) by application of each of said bypass signals (56) to a corresponding gate (51) of said bypass AND gate array (55); and said bypass signals (56) derived from a vote status and control signal (39a) upon a remote command to test or bypass said voter action.

3. The fault tolerant computer system (10) as claimed in claim 1 in which said CPU signals (52) are data signals.

4. The fault tolerant computer system (10) as claimed in claim 1 in which said CPU signals (52) are address signals.

5. The fault tolerant computer system (10) as claimed in claim 3 in which each one of said plurality of CPUs (22) is in one of the following stable states: enabled and voting; commanded disabled; non-agreement and disabled; bypassed; and powered down.

6. A fault tolerant computer system (10) comprising:

a plurality of reduced instruction set (RIS) central processing units (CPUs) (32) operating in synchronism, each operating step of each of said plurality of central processing units (32) being accomplished in parallel and substantially simultaneously with each of the other of said plurality of RIS CPUs (32) each CPU clock cycle; each of said plurality of RIS CPUs (32) having a plurality of CPU outputs (33b) and a plurality of CPU inputs (33a);

a system bus (12);

a CPU bus (35a);

a voter (34); said voter having a voted output (35) carried on said CPU bus (35a);

said voter (34) being coupled to each one of said plurality of RIS CPUs (32); each said CPU output (33b) being compared one with another by said voter (34) each said clock cycle;

a memory (46);

a memory controller (36) having a vote status and control circuit (38), a memory interface (40) and a bus interface (42);

said memory controller (36) coupled to said voter (34) through said CPU bus (35a), coupled to said system bus (22) through said bus interface (42) and coupled to said memory (46) through said memory interface (40);

said memory (46) providing memory output (37a) to said memory controller (36); said memory output (37a) being distributed equally as said plurality of CPU inputs (33a) to each of said plurality of RIS CPUs (32) through said memory controller (36) and said voter (34);

said voted output (35) being provided by said memory controller (36) as input to said system memory (46), said vote status and control circuit (38) and to said system bus (12);

agreement of a majority of said plurality of CPU outputs (33b) supplied to said voter (34) resulting in said voted output (35) having a value of said majority of said plurality of CPU outputs (33b);

any one of said plurality of CPU outputs (33b) which does not agree with a majority of said plurality of CPU outputs (33b) being detected by said voter (34) and an error signal produced thereby being sent to said vote status and control circuit (38);

said vote status and control circuit (38) reacting to said error signal indicating disagreement of said plurality of CPU outputs (33b) and causing re-synchronizing of said plurality of RIS CPUs (32).

7. The fault tolerant computer system (10) as claimed in claim 6 in which said plurality of RIS CPUs (32) number at least four.

8. The fault tolerant computer system (10) as claimed in claim 6 in which said plurality of RIS CPUs (32) are commercial, non-radiation-hardened chips.

9. The fault tolerant computer system (10) as claimed in claim 6, further comprising:
   a first computer (30);
   a second computer (30);
      said first computer (30) including said plurality of CPUs (32), said voter (34) said memory (46), said memory controller (36) and said CPU bus (35a);
      said second computer (30) including said plurality of CPUs (32), said voter (34) said memory (46), said memory controller (36) and said CPU bus (35a);
      said first computer (30) being coupled to said system bus (12);
      said second computer (11b) being coupled to said system bus (12) and maintained as an error-free replacement for said first computer (11a);
   said error signal causing said vote status and control circuit (36) to react and substitute said second computer (30) for said first computer (30) when less than three of said plurality of RIS CPUs (32) are operable and less than two of said plurality of said RIS CPUs (32) agree.

10. The fault tolerant computer system (10) as claimed in claim 9 in which resynchronization of said RIS CPUs (32) and substitution of said computer (30) are controlled by software run by said RIS CPUs (32).

11. The fault tolerant computer system (10) as claimed in claim 9 in which each one of said plurality of RIS CPUs (32) is in one of the following stable states: enabled and voting; commanded disabled; disagreeing and disabled; bypassed; and powered down.

12. A method of fault management for computer systems comprising the steps of:
   providing a first computer (30) having a plurality of reduced instruction set (RIS) central processing units (CPUs) (32);
   operating said plurality of RIS CPUs (32) in synchronism; accomplishing each operating step of each of said plurality of RIS CPUs (32) in parallel and substantially simultaneously with each of the other of said plurality of RIS CPUs (32);
   providing a voter (34) within said computer (30);
   coupling said voter (34) to a plurality of CPU outputs (33b) of each one of said plurality of RIS CPUs (32); coupling each one of said plurality of RIS CPUs (32) to a plurality of outputs (33a) of said voter (34);
   providing a memory (46);
   providing a system bus (12);
   providing a memory controller (36) having a vote status and control circuit (38), a memory interface (40) and a bus interface (42);
   coupling said memory controller (36) to said voter (34), to said system bus (12) through said bus interface (42), and to said memory (46) through said memory interface (40);
   providing memory output signals (37a) from said memory (46) to said memory controller (36); distributing said memory output signals (37a) to each of said RIS CPUs (32) through said memory controller (36), equally through said plurality of outputs (33a) of said voter (34);
   providing said plurality of CPU outputs (33b) from said plurality of RIS CPUs (32) as inputs to said voter (34) for comparison;
   comparing said plurality of CPU outputs (33b) in said voter (34);
   agreement of a majority of said plurality of CPU outputs (33b) supplied to said voter (34) resulting in a voted output signal (35);
   said voted output signal (35) having a value of said majority of said plurality of CPU outputs (33b);
   providing said voted output signal (35) from said voter (34) as input signals (37b) to said system memory (46), as input to said vote status and control circuit (38) and as input (41) to said system bus (12);
   detecting disagreement of any one of said plurality of CPU outputs (33b) with a majority of said plurality of CPU outputs (33b) with said voter (34) and producing thereby error signals (39b);
   applying said error signals (39b) to said vote status and control circuit (38); and re-synchronizing said plurality of RIS CPUs (32) by action of said vote status and control circuit (36).

13. The method as claimed in claim 12 further including the step of substituting an error-free second computer (30) for a faulty said first computer (30) by action of said vote status and control circuit (36) when less than three of said plurality of RIS CPUs 32 are operable and less than two of said plurality of CPUs 32 agree.

14. The method as claimed in claim 12 further including the step of substituting an error-free computer (30) when less than two said RIS CPUs (32) are operable.

* * * * *